United States Patent [19]

Lamson

[11] Patent Number: 4,737,997

[45] Date of Patent: Apr. 19, 1988

[54] PATIENT TRANSFER DEVICE

[76] Inventor: Philip Lamson, 18145 Muriel Ave., San Bernardino, Calif. 92407

[21] Appl. No.: 878,435

[22] Filed: Jun. 25, 1986

[51] Int. Cl.[4] .......................... B60N 1/02; A61G 5/02

[52] U.S. Cl. .......................................... 5/81 R; 51/8; 280/289 WC; 297/DIG. 4; 414/921

[58] Field of Search .................. 5/81 R, 81 B, 86, 82; 297/DIG. 4, 430, 440, 441, DIG. 2, DIG. 10; 280/289 W C; 414/921

[56] References Cited

U.S. PATENT DOCUMENTS

| | | | |
|---|---|---|---|
| 1,349,674 | 8/1920 | Jenkins | 5/86 |
| 1,635,575 | 7/1927 | Cole | 5/81 B |
| 2,005,972 | 6/1935 | Gallop | 5/82 |
| 2,680,855 | 6/1954 | Robinson | 5/86 |
| 2,694,438 | 11/1954 | Frech | 297/440 |
| 2,738,001 | 3/1956 | Drabert | 297/440 |
| 3,015,114 | 1/1962 | Selb | 5/86 |
| 3,271,796 | 9/1966 | Dillman | 5/82 R |
| 3,320,949 | 5/1967 | Hatfield | 5/82 R |
| 3,677,601 | 7/1972 | Morrison | 5/82 R |
| 3,981,484 | 9/1976 | James | 414/921 |
| 4,278,387 | 7/1981 | Seguela | 297/DIG. 4 |
| 4,312,536 | 1/1982 | Lloyd | 297/440 |
| 4,365,924 | 12/1982 | Brigman | 280/289 WC |
| 4,399,572 | 8/1983 | Johansson | 297/440 |
| 4,606,082 | 8/1986 | Kuhlman | 5/81 R |

FOREIGN PATENT DOCUMENTS

| | | | |
|---|---|---|---|
| 61516 | 10/1939 | Norway | 5/82 |

*Primary Examiner*—John E. Murtagh
*Attorney, Agent, or Firm*—William W. Haefliger

[57] ABSTRACT

A method of moving a person from a bed to a wheelchair employs a seat section and a conveyor section. It includes the steps (a) fitting the seat section to the rear of said person who is lying on his side on the bed,
(b) rolling the seat section and said person to bring the person into sitting position, on the seat section, and with the person's legs overhanging the side of the bed,
(c) bringing the conveyor section and seat section into removably attached relation so that the conveyor section supports the seat section, and said person thereon, as the conveyor section and attached seat section are moved horizontally away from the bed,
(d) conveying the seat section onto a wheelchair,
(e) and detaching the conveyor section away from the seat section whereby the seat section and person thereon are fully supported by the wheelchair.

19 Claims, 4 Drawing Sheets

FIG. 9.
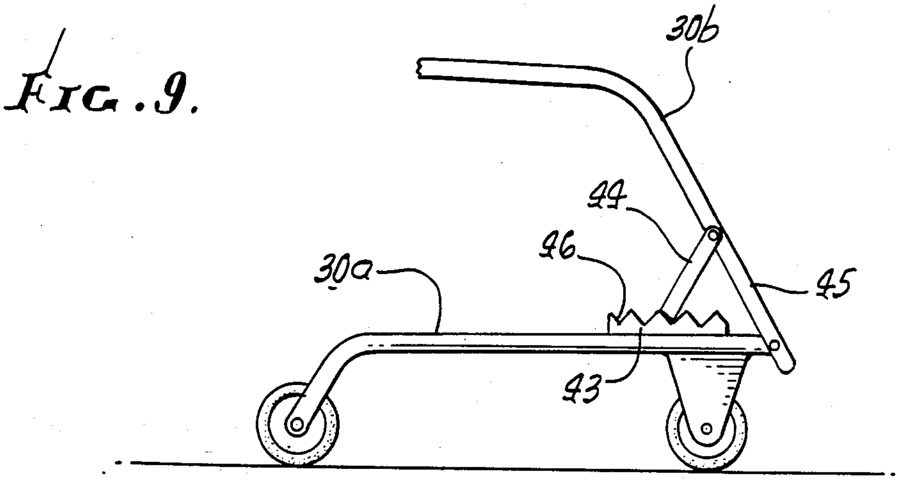
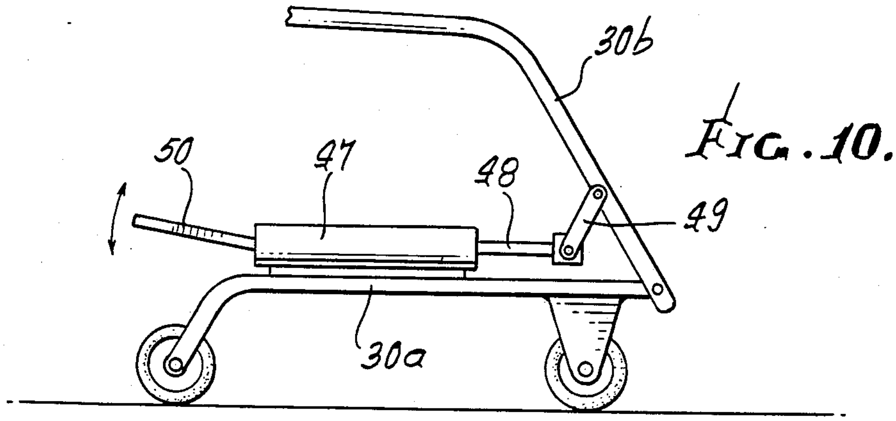
FIG. 10.
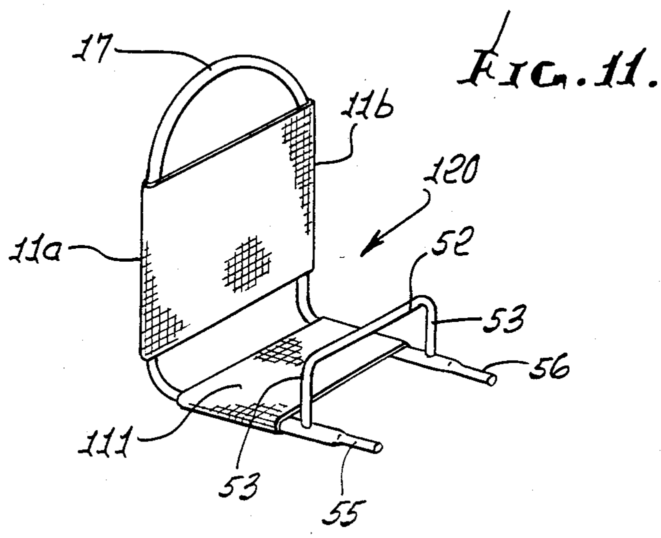
FIG. 11.

PATIENT TRANSFER DEVICE

BACKGROUND OF THE INVENTION

This invention relates generally to movement of bedridden persons, and more particularly concerns apparatus and method of assisting a person to move from a bed to a wheelchair, and back. The invention enables a nursing home or hospital attendant, or a family member, to provide such assistance safely, without hurting the patient, and with a minimum of physical effort by the assisting person, consistent with the avoidance of use of electric or other external power.

A large and steadily growing number of infirm or ill people need assistance to be moved between bed and wheelchair. In an institution such as a nursing home, a number of people will likely have to be moved one or more times per day, to a dining room, to a bathroom, for bed-sore prevention, or simply to provide the patient a change from lying in bed. Institutional routine will often make it desirable to move a number of patients at nearly the same time, as to a meal.

The present standard moving procedure is for the assistant first to grasp the patient (who is initially lying in bed) and assist the patient to a sitting position on the side of the bed, from which the patient can be carried or otherwise assisted to the nearby wheelchair.

The present procedure has several drawbacks:

1. It may take two strong assistants to move a heavy patient.

2. The patient could be dropped or otherwise mishandled.

3. Even with careful handling, the fragile, parchment-like skin of an old patient can be torn or abraded by the grasping process which is part of this procedure.

Because of the disadvantages of the standard, manual patient-assist procedure, and because of the apparent present lack of a convenient, cost-effective patient-mover, there is a clear need for a patient mover which materially improves the reliability and ease of assisted transport of an infirm patient. Above all, it is important for the new patient mover to be safe to use—for it to work without injuring the patient (or assistant). Also, it should function with a minimum of discomfort or inconvenience to the patient, and made afforadable.

SUMMARY OF THE INVENTION

Basically, the method of moving a person from a bed to a wheechair employs a seat section and conveyor section, and includes the steps:

(a) fitting the seat section to the rear of the person who is lying on his side on the bed, (b) rolling the seat section and the person to bring the person into sitting position, on the seat section, and with the person's legs overhanging the side of the bed, (c) bringing the conveyor section and seat section into removably attached relation so that the conveyor section supports the seat section, with the person thereon, as the conveyor section and attached seat section are moved horizontally away from the bed, (d) conveying the seat section onto a wheelchair, (e) and detaching the conveyor section away from the seat section whereby the seat section and person thereon are fully supported by the wheelchair.

Also, the apparatus of the invention basically includes:

(a) a seat section configured and maneuverable to support a person on a bed, with the person's legs overhanging the side of the bed, and (b) a conveyor section configured to receive and support the seat section, the seat section and conveyor section having members that interfit as the conveyor section is maneuvered toward the seat section on the bed, so that the two sections are attachable together for transport of the seat section and the person thereon, by the conveyor section off the bed and toward a wheelchair, (c) the seat section sized for reception by the wheelchair, and for transferred support by the wheelchair as the conveyor section is detached from the seat section and relatively moved therefrom.

These and other objects and advantages of the invention, as well as the details of an illustrative embodiment, will be more fully understood from the following specification and drawings, in which:

DRAWING DESCRIPTION

Figure 6:
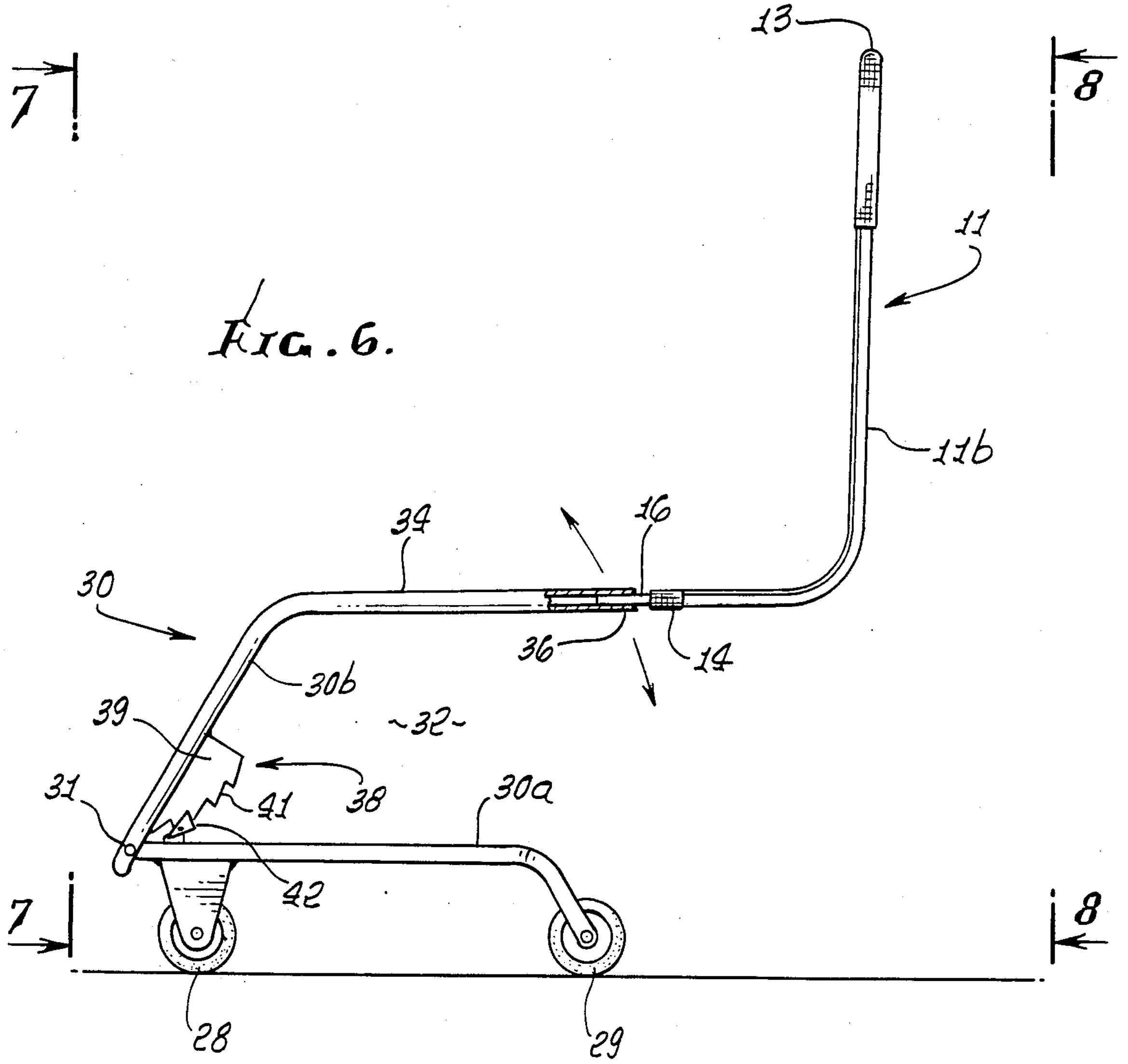
FIG. 6 is a side elevation on lines 6—6 of FIG. 5, and partly broken away to show details of first and second section assembly.
Figure 7:
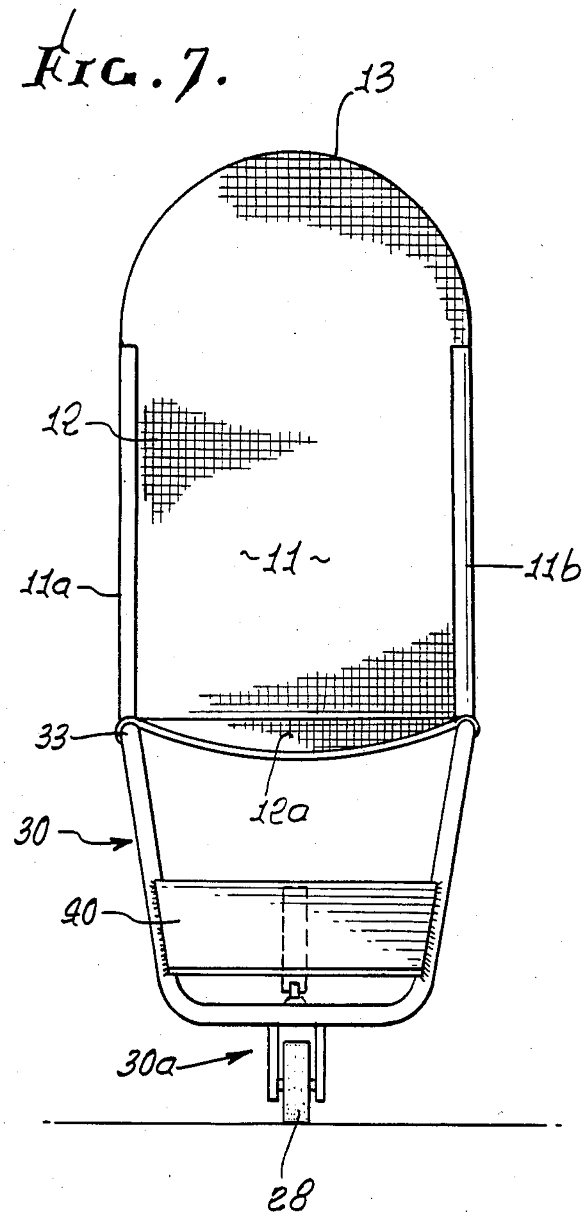
Figure 8:
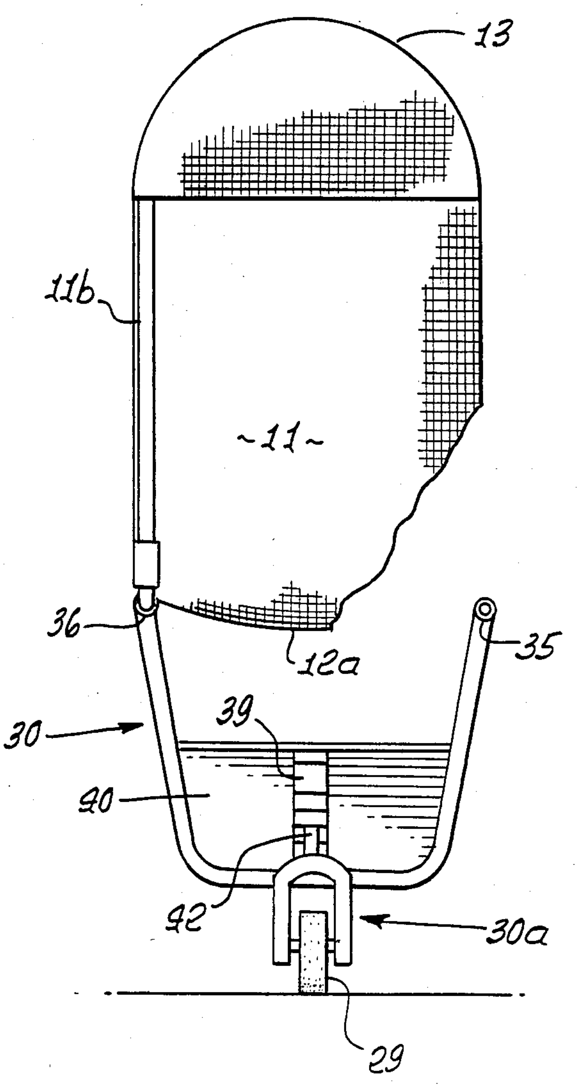

FIGS. 7 and 8 are elevations on lines 7—7 and 8—8 of FIG. 6; and FIGS. 9 and 10 show modifications of a conveyor section.

FIG. 11 shows a modification of a seat section.

DETAILED DESCRIPTION

Figure 1:
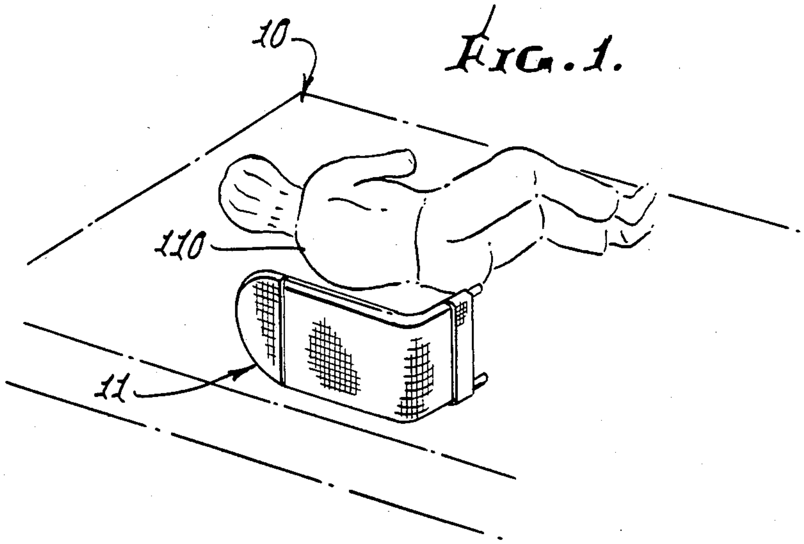
FIG. 1 is a perspective view showing use of one section of the apparatus of the invention, on a bed.

FIG. 1 shows a bed 10 and a patient or person 11 reclining on his side on the bed. A seat section 11 is shown being moved toward the back side of the person 10, so as to closely interfit the back side of the person. The seat section 11 is generally L-shaped, and may advantageously include rigid, L-shaped side rods or tubes 11*a* and 11*b*, and fabric 12 extending between those rods or tubes; and the fabric may include a seat 12*a* and a back rest 12*b*. A rigid cross member 13 extends between the rods at the upper ends therof, and a seat shaped, rigid cross-member 14 may be provided to extend between the rods. Projecting forwardly of the cross member 14 are connection members 15 and 16, which may be projecting ends of the rods 11*a* and 11*b*.

Figure 2:
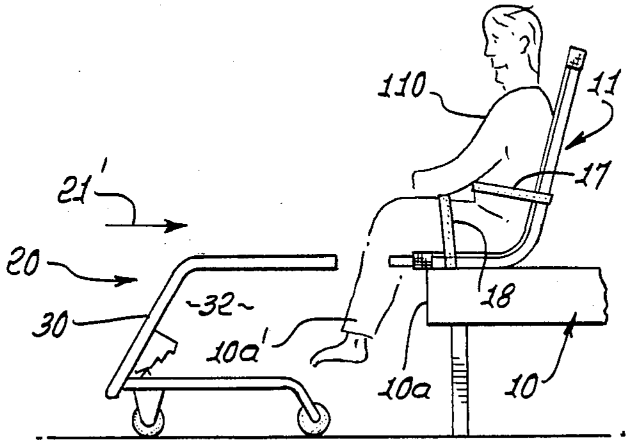
FIGS. 2 and 3 are side elevations showing use of the section of the apparatus seen in FIG. 1 to support a patient during transfer to a second section of the apparatus of the invention, and transport to a wheel chair.

The seat section may be strapped to the patient, as indicated by straps 17 and 18 in FIG. 2. The patient and seat section are then rolled about 90° to bring the patient into upright seated position, as shown in FIG. 2, with the patient's legs dangling or overhanging the side 10*a* of the bed.

Figure 3:
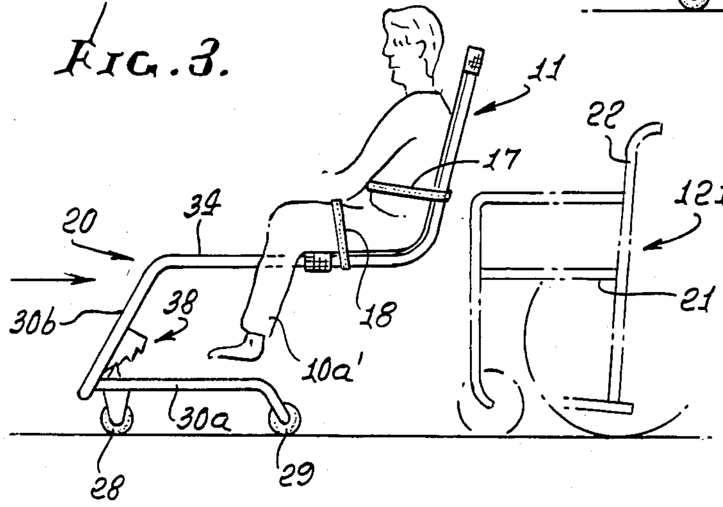
Figure 4:
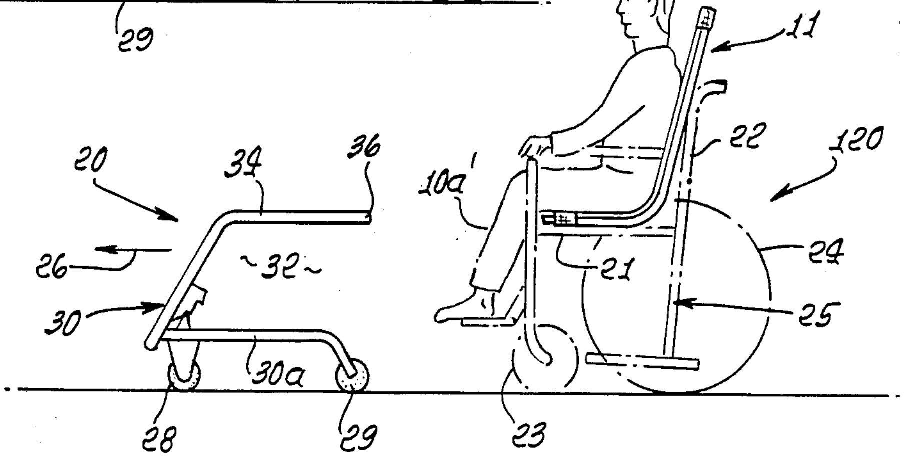
FIG. 4 is a view like FIG. 3, showing separation of the second section of the apparatus after the first section has been transferred to a wheelchair.

Next, a conveyor section 20 is moved in the direction of arrow 21, in FIG. 2, to bring it into cooperative relation with the seat section, as for example attached to the seat section. The purpose is to interconnect the seat and conveyor sections so that the conveyor section may be moved away from the bed with the seat section and patient supported and transported, off the bed, and toward a wheelchair. See FIG. 3. FIG. 4 shows the seat section 11 as having been transferred to a wheelchair 21 to be fully supported by the seat and back of the latter, indicated at 21 and 22. The wheelchair also includes wheels 23 and 24, and frame 25. Conveyor section 20 is detached from the chair section and removed away from the wheelchair in direction 26. The seat section 11 is sized to closely interfit the seat and back of the wheelchair, as shown.

Figure 5:
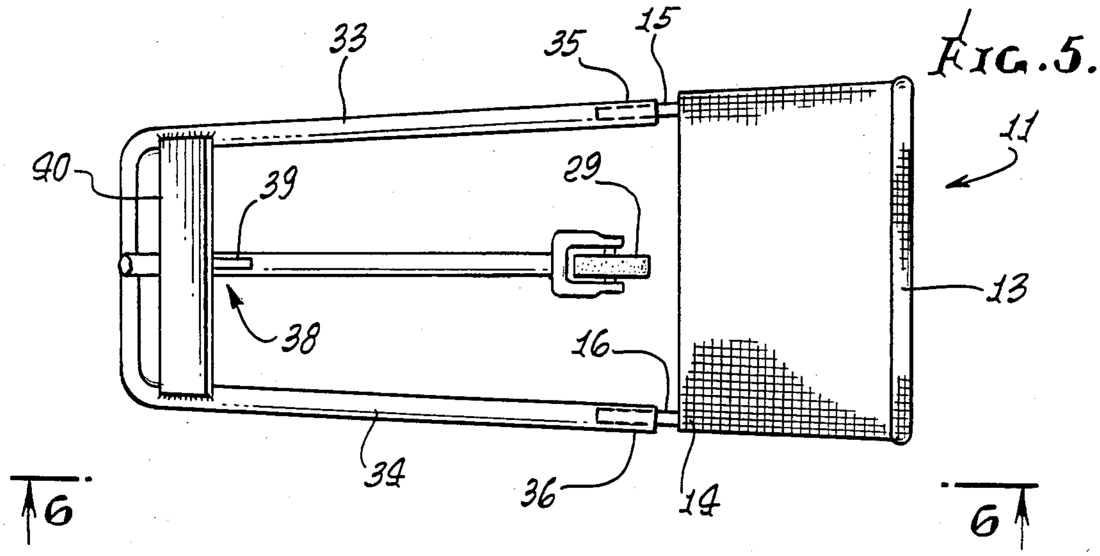
FIG. 5 is an enlarged plan view of the combined and assembled sections.

As more completely shown in FIGS. 5 and 6, the conveyor section has multiple wheels 28 and 29, and a frame 30 supported by the wheels. The frame includes a lower portion 30*a*, and an upper portion 30*b*, these being pivotally interconnected at 31. The portions 30*a* and 30*b* define an opening 32 sized to receive the side of the bed when the conveyor is attached to the seat section.

The upper portion 30*b* of the frame includes two rod or tube elements 33 and 34 which terminate at members 35 and 36. Thus, two pairs of interconnecting members are provided, i.e. telescopically interconnecting members 15 and 35, and telescopically interconnecting members 16 and 36. See FIG. 5. The elements 33 and 34 are sidewardly or laterally spaced apart to allow room for the person's legs 10*a* therebetween.

Adjusting means is provided and connects conveyor frame portion 30*b* and 30*a* to allow adjustment in elevation of the elements 33 and 34 so as to align members 35 and 36 with seat members 15 and 16, to facilitate the telescopic interconnection, i.e. accommodate different elevations of beds and mattresses that support the seat as in FIG. 2. Such apparatus may include a ratchet 38. As shown in FIG. 6, the ratchet includes a serrated part 39 carried by cross-piece 40, and having cogs 41 selectably engaged by a pivoted part 42 on portion 30*a*.

FIG. 9 shows a modified form, wherern the ratchet plate 43 is carried by the lower portion 30*a*, and a brace 44 is carried by the leg 45 of the upper portion 30*b*, and selectively engages the cogs 46. In the FIG. 10 modification, a fluid actuator 47 is provided on portion 30*a*, and variably extends a plunger 48 connected by link 49 of frame portion 30*b*. A foot treadle 50 controls the actuator and extension of plunger 48.

In FIG. 11, the seat section 111 is the same as section 11. The conveyor 120 includes cros piece 52 connected by parts 53 to members 55 and 56 corresponding to members 15 and 16 discussed above. The user's legs extend beneath the cross piece 52, which provides a grip by which the seat may be elevated, for carrying the seat section from a bed to a wheelchair, and vice versa. The manual conveyor 120 is easily detachable from the seat section, by telescopically disconnecting members 55 and 56 from seat members 15 and 16.

While the principles of the invention have now been made clear in illustrated embodiments, there will be immediately obvious to those skilled in the art many modifications of structure, arrangements, proportions, the elements materials, and components used in the practice of the invention, and otherwise, which are particularly adapted for specific environments and operational requirements without departing from these principles. The appended claims are therefore intended to cover and embrace any such modifications within the limits only of the true spirit and scope of the invention.

We claim:

1. The method of moving a person from a bed to a wheelchair, and employing a seat section and a conveyor section, that includes (a) fitting the seat section to the rear of said person who is lying on his side on the bed, (b) rolling the seat section and said person to bring the person into sitting position, on the seat section, and with the person's legs overhanging the side of the bed, (c) bringing the conveyor section and seat section into removably attached relation so that the conveyor section supports the seat section, and said person thereon, as the conveyor section and attached seat section are moved horizontally away from the bed, (d) conveying the seat section onto a wheelchair, (e) and detaching the conveyor section away from the seat section whereby the seat section and person thereon are fully supported by the wheelchair.

2. The method of claim 1 wherein said (a) step includes sidewardly contacting the seat section against the rear of said side-lying person.

3. The method of claim 2 including attaching the seat section to said person.

4. The method of claim 1 wherein said step (b) includes rotating the seat section and person approximately 90 degrees, on the bed.

5. The method of claim 1 wherein said step (c) includes generally horizontally telescopically interfitting the seat section and conveyor section.

6. The method of claim 5 wherein said step (c) includes interfitting the conveyor section and bed so that the conveyor section extends above and below the bed during said telescopic interfitting.

7. The method of claim 5 wherein the conveyor section has upper and lower elements which are adjustably interconnected, and including the step of adjusting the elevation of the upper element so as to align the conveyor section relative to the seat section for telescopic interfit.

8. The method of claim 5 wherein said (e) step includes separating the telescopic interfit of the seat and conveyor sections.

9. The method of claim 1 wherein the conveyor section is wheeled, and said step (d) includes wheeling the conveyor section, seat section and seated person away from the bed and toward a wheelchair.

10. In apparatus for moving a person from a bed to a wheelchair, the combinaton comprising:

(a) a seat section configured and maneuverable to support a person on a bed, with the person's legs overhanging the side of the bed, and (b) a conveyor section configured to receive and support the seat section, the conveyor section having wheels and a frame supported by the wheels, the seat section and conveyor section having members that interfit as the conveyor section is maneuvered toward the seat section on the bed, so that the two sections are attachable together for transport of the seat section and the person thereon, by the conveyor section off the bed and toward a wheelchair, (c) the seat section sized for reception by the wheelchair, and for transferred support by the wheelchair as the conveyor section is detached from the seat section and relatively moved therefrom, (d) the frame including upper and lower portions adjustable means connecting said portions to allow pivoting of the upper portion relative to the lower portion, thereby to adjust the elevation of the seat section, (e) said adjustable means including one of the following:

(i) ratchet means (ii) acuator means

11. The apparatus of claim 10 wherein the seat section is generally L-shaped, and has means for securing a person to the section so as to bring the seat and person into upright position from a side-lying position.

12. The apparatus of claim 10 wherein said members have telescoping interfit.

13. The apparatus of claim 12 wherein there are two pairs of said members, each pair having telescoping interfit, the two pairs located at opposite sides of the seat section.

14. The apparatus of claim 10 wherein the conveyor has multiple wheels, and a frame supported by the wheels, the frame defining two of said members that extend generally horizontally.

15. The apparatus of claim 14 wherein the frame defines an opening that is sized to receive the side of a bed.

16. The apparatus of claim 10 wherein said seat section includes an L-shaped frame having two L-shaped side rods, and cross rod means interconnecting the side rods.

17. The apparatus of claim 16 wherein the seat section includes a seat extending between said side rods, and spaced from projecting end members of the side rods that attach to said members associated with the conveyor section.

18. The apparatus of claim 10 including a lifting grip on the conveyor, proximate said members.

19. In apparatus for moving a person from a bed to a wheelchair, the combination comprising:

(a) a seat section configured and maneuverable to support a person on a bed, with the person's legs overhanging the side of the bed, and (b) a conveyor section configured to receive and support the seat section, the seat section and conveyor section having members that interfit as the conveyor section is maneuvered toward the seat section on the bed, so that the two sections are attachable together for transport of the seat section and the person thereon, by the conveyor section off the bed and toward a wheelchair, (c) the seat section sized for reception by the wheelchair, and for transferred support by the wheelchair as the conveyor section is detached from the seat section an relatively moved therefrom, (d) the conveyor section having multiple wheels, and a frame supported by the wheels, the frame defining two of said members that extend generally horizontally, (e) the frame defining an opening that is sized to receive the side of a bed, (f) the frame including upper and lower portions, and adjustable means connecting said portions to allow pivoting of the upper portion relative to the lower portion, thereby to adjust the elevation of the upper portion, (g) said adjustable means including one of the following:

(i) ratchet means (ii) fluid actuator means.

* * * * *